United States Patent [19]
Appeldorn et al.

[11] Patent Number: 5,261,184
[45] Date of Patent: Nov. 16, 1993

[54] GREENHOUSE CONSTRUCTION AND IMPROVED METHOD OF GROWING PLANTS

[75] Inventors: Roger H. Appeldorn, White Bear Lake; Paul A. Jaster, Arden Hills; Sanford Cobb, Jr., St. Mary's Point, all of Minn.

[73] Assignee: Minnesota Mining and Manufacturing Company, St. Paul, Minn.

[21] Appl. No.: 713,792

[22] Filed: Jun. 12, 1991

[51] Int. Cl.$^5$ .............................................. A01G 9/00
[52] U.S. Cl. .......................................... 47/17; 52/473
[58] Field of Search ............................... 47/17; 52/473

[56] References Cited

U.S. PATENT DOCUMENTS

| | | |
|---|---|---|
| D. 275,889 | 10/1984 | Nelson . |
| 3,957,029 | 5/1976 | Nozik et al. . |
| 3,987,780 | 10/1976 | Nozik et al. . |
| 4,128,307 | 12/1978 | Badertscher ............... 47/17 RM |
| 4,141,498 | 2/1979 | Marschner . |
| 4,173,212 | 11/1979 | Whitcomo . |
| 4,184,479 | 1/1980 | Ratiff, Jr. . |
| 4,195,441 | 4/1980 | Baldwin . |
| 4,198,953 | 4/1980 | Power . |
| 4,249,340 | 2/1981 | Maes ............... 47/17 RL |
| 4,299,116 | 9/1981 | Williams . |
| 4,306,542 | 12/1981 | Reinert . |
| 4,329,021 | 5/1982 | Bennett et al. . |
| 4,340,036 | 7/1982 | Williams . |
| 4,462,390 | 7/1984 | Holdridge et al. . |
| 4,586,297 | 5/1986 | Tagiasco ............... 47/17 RM |
| 4,593,976 | 6/1986 | Eijadi et al. . |
| 4,800,868 | 1/1989 | Appeldorn et al. . |
| 4,831,793 | 5/1989 | Galloway et al. . |
| 4,864,783 | 9/1989 | Esposito . |
| 4,874,225 | 10/1989 | Pruszenski, Jr. . |
| 4,895,904 | 1/1990 | Allingham . |

FOREIGN PATENT DOCUMENTS

| | | | |
|---|---|---|---|
| 0070093 | 1/1983 | European Pat. Off. | ......... 47/17 RL |
| 371000 | 5/1990 | European Pat. Off. | ......... 47/17 RL |
| 1521381 | 11/1989 | U.S.S.R. | ......... 47/17 RL |
| 2231080 | 11/1990 | United Kingdom | ......... 47/17 RL |
| 8002356 | 5/1980 | World Int. Prop. O. | ...... 47/17 RM |

OTHER PUBLICATIONS

Siemens—Tageslichtsystem.
3M, Curved Linear Solar Concentrating Lensfilm—11X.
Architecture, pp. 90–91, Aug. 1990.
Solar Optical Products, 3M Passive Daylight Monitor System.
Daylighting Panels.
3M Proposal to Integrate a Reflective Daylight Monitor System into the Texas Capitol Expansion Project.

*Primary Examiner*—Henry E. Raduazo
*Attorney, Agent, or Firm*—Gary L. Griswold; Walter N. Kirn; Jeffrey J. Hohenshell

[57] ABSTRACT

An improved greenhouse comprising a plurality of walls, a light-transmitting roof panel; and an optical system located inside the greenhouse is described. The optical system comprises a plurality of rows of elongate spaced optical panels generally adjacent and extending transversely across the light-transmitting roof panel. Each panel comprises a thin backing portion forming first and second concave, opposite sides, a first light reflecting means including light-reflecting surfaces attached to the first side of the backing and a second light reflecting means including light-reflecting surfaces attached to the second side of the backing such that the light-reflecting surfaces face generally oppositely.

Also disclosed is an improved method of growing plants utilizing such a greenhouse construction.

10 Claims, 4 Drawing Sheets

… … …

GREENHOUSE CONSTRUCTION AND IMPROVED METHOD OF GROWING PLANTS

TECHNICAL FIELD

This invention relates to an improved greenhouse construction, and to an improved method of growing plants using the improved green house construction.

BACKGROUND OF THE INVENTION

The art is replete with greenhouses used to raise fruits, vegetables, and other plants, particularly during winter months. Currently, an estimated 250 acres of greenhouses are constructed in the United States each year. Conventional greenhouses are typically constructed with glass windows or translucent plastic sheeting, and suffer from a number of disadvantages. The cost of construction of a glass green house is relatively high, perhaps as much as $15-$25 per square foot. While the initial cost of a plastic greenhouse is somewhat lower, they require constant maintenance. The plastic sheeting currently available typically must be replaced every two to four years. The plastic is subject to being ripped or torn, and if this occurs during cold weather, the entire crop in the greenhouse could be lost.

Furthermore, conventional greenhouses are poorly insulated. While double panels of glass or plastic can be used, this increases the cost of construction and reduces light transmission. Thus heating requirements for conventional greenhouses are high, particularly in colder latitudes. Conversely, in warmer latitudes, air conditioning may be required because of the high solar gain.

Still another problem with conventional greenhouses is the lack of uniformity of the light. During winter months, sunlight enters the greenhouse at oblique angles. This results in low levels of light and plant-to-plant shading, which can cause uneven growth. This may require repositioning the plants to maintain uniform growth. Light diffusing films can be used to more evenly distribute the light, but they reduce the amount of light available to the plants.

Optical lighting systems are known for lighting buildings such as office buildings. For example, the multi-story office building known as 3M Austin Center located in West Austin, Texas includes an optical system comprising a first light reflecting means located outside the building, a vertical light transmitting roof panel and a second light reflecting means located inside the building. The 3M Austin Center optical system supports plant growth inside the building. However, the plants growing inside the building are grown for aesthetic purposes.

Other proposed multi-story office building optical systems comprise first and second light reflecting means and a sloped, light transmitting roof panel. However, such structures are not designed for the constraints of a commercial greenhouse. As a result, unduly large portions the aperture of the light transmitting roof panel is blocked by structures such as roof and optical supports and insulation.

DISCLOSURE OF THE INVENTION

The present invention provides a greenhouse construction that is less expensive to build and maintain than conventional greenhouses; a greenhouse construction that can be insulated to reduce energy requirements for heating and cooling, thereby reducing operating costs; and a greenhouse that provides more natural lighting conditions, with more evenly distributed, vertically oriented light, simulating summer sunlight for better and more uniform plant growth. The greenhouse construction also provides minimal blockage of a light transmitting roof panel to maximize the light transmitted to the plants, particularly during winter months.

Generally, the improved greenhouse construction of the present invention comprises a plurality of walls, a light-transmitting roof panel; and an optical system located inside the greenhouse. The optical system comprises a plurality of rows of elongate spaced optical panels generally adjacent and extending transversely across the light-transmitting roof panel. Each panel comprises a thin backing portion forming first and second opposite sides, a first light reflecting means including light-reflecting surfaces attached to the first side of the backing and a second light reflecting means including light-reflecting surfaces attached to the second side of the backing such that the light-reflecting surfaces face generally oppositely.

The plurality of elongated spaced optical panels are positioned such that the first light reflecting means faces the second light reflecting means of an adjacent panel so that the first light-reflecting means receives light transmitted through the roof panel and reflects the light to the second light-reflecting means of the adjacent panel, and the second light-reflecting means receives light from the first light-reflecting means and reflects the light substantially vertically downwardly.

The roof panel is preferably sloped generally toward the equator, to face the sun. In most latitudes, the plane of the roof panel is preferably sloped at an angle of between about 15° and about 20° with respect to the horizontal.

The longitudinal axes of the optical panels preferably extends generally transversely with respect to the roof panel, perpendicular to the direction of the slope. The sidewalls of the greenhouse do not have to transmit light, and thus can be made of an inexpensive material, and preferably one with good thermal insulating properties.

According to the improved method of growing plants of this invention, a greenhouse is provided having a sloped light-transmitting roof panel and an optical system located inside the greenhouse. The optical system preferably comprises a plurality of rows of elongate spaced optical panels generally adjacent and extending transversely across the light-transmitting roof panel. Each panel comprises a thin backing portion forming first and second opposite sides, a first light reflecting means including light-reflecting surfaces attached to the first side of the backing and a second light reflecting means including light-reflecting surfaces attached to the second side of the backing such that light-reflecting surfaces face generally oppositely. The method includes the steps of (1) positioning the plurality of elongate spaced optical panels such that the first light reflecting means faces the second light reflecting means of an adjacent panel so that the first light-reflecting means receives light transmitted through the roof panel, (2) reflecting the light transmitted through the roof panel to the second light-reflecting means of the adjacent panel, and (3) reflecting the light from the first light-reflecting means substantially vertically downwardly by the second light-reflecting means.

A greenhouse constructed according to the principles of the present invention does not rely upon or require transmission through the walls, and thus the walls of the greenhouse can be made from an inexpensive, durable material. The amount of plastic or glass surface that must be kept clean and in good repair is thereby reduced. This reduces the initial cost of constructing the greenhouse, as well as the cost of maintaining the greenhouse. Moreover, the walls may be constructed from an insulating material, thereby reducing the amount of heating and air conditioning required, making the greenhouse less expensive to operate. The optical system distributes the light generally vertically downwardly in the greenhouse, to provide more even light distribution, and to simulate summer growth conditions, even in winter. This not only achieves more even plant growth, but helps to eliminate plant-to-plant shading, which reduces or eliminates the need to continually rearrange the plants in the greenhouse. This helps reduce the cost of operating the greenhouse. The optical system can collect and use more of the incident sunlight than conventional greenhouses, and the greenhouse of this invention can be oriented maximize collection of light during peak growth periods.

Additionally, a greenhouse constructed according to the present invention minimizes blockage of the aperture of the light transmitting roof by structure such as roof and optical support structures and insulation. Such a greenhouse increases the light transmitted to the plants, particularly during winter months.

BRIEF DESCRIPTION OF THE DRAWING

The present invention will be further described with reference to the accompanying drawing wherein like reference numerals refer to like parts in the several views, and wherein.

DETAILED DESCRIPTION OF THE PREFERRED EMBODIMENT

Figure 1:
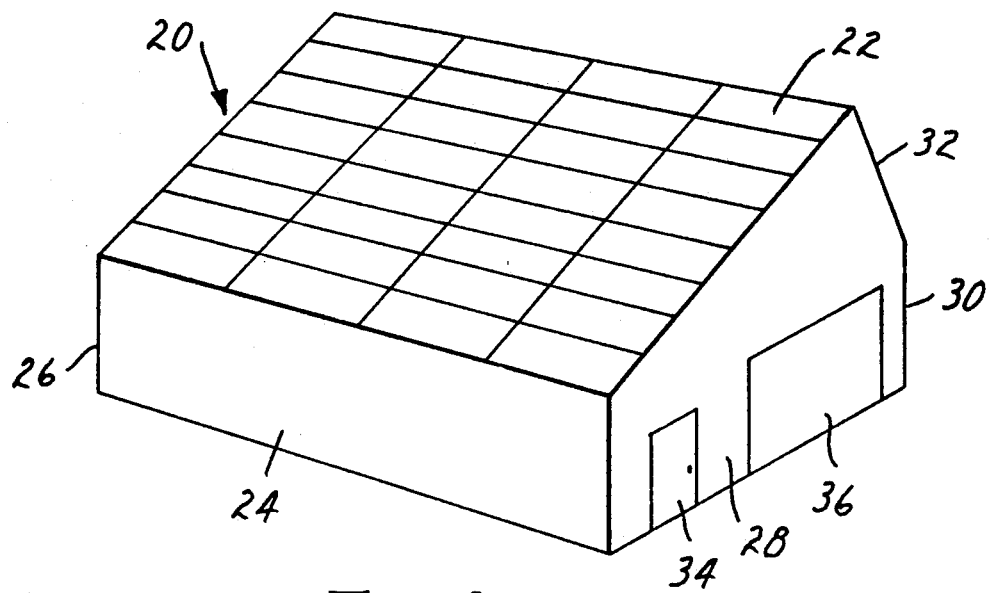
FIG. 1 is a perspective view of a greenhouse constructed according to the principles of this invention.

A greenhouse constructed according to the principles of this invention is indicated generally as 20 in FIG. 1. The greenhouse 20 comprises a sloped light-transmitting roof panel 22, and a plurality of walls. The roof panel 22 is preferably made from a transparent or translucent acrylic, although it could be made of some other plastic or of glass. In the preferred embodiment shown in FIG. 1, there is a front wall 24, left and right side walls 26 and 28, and a back wall 30. The back wall 30 can extend up to meet the roof panel 22, or, preferably, there is a rear roof panel 32 extending upwardly at an angle from the top of the back wall 30, to meet the roof panel 22. The rear roof panel 32 increases the structural integrity of the greenhouse 20, which can result in a reduction in construction costs. Access doors 34 and 36 may be provided to permit attendants and equipment to enter the greenhouse.

Because the light necessary for plant growth is transmitted through the roof panel 22, the walls 24, 26, 28, 30, and the panel 32, do not have to be made translucent. This results in several important advantages. First, the walls and the panel can be made from a relatively inexpensive and more durable material, reducing initial construction costs and subsequent maintenance costs. The surface area of plastic or glass that must be kept clean and in repair is significantly reduced. Second, since the walls do not have to be translucent, they can be made from a thermal insulating material. This decreases heat transfer to and from the greenhouse 20, thereby decreasing the heating and air conditioning load, and reducing the expenses of operating the greenhouse.

Figure 2:
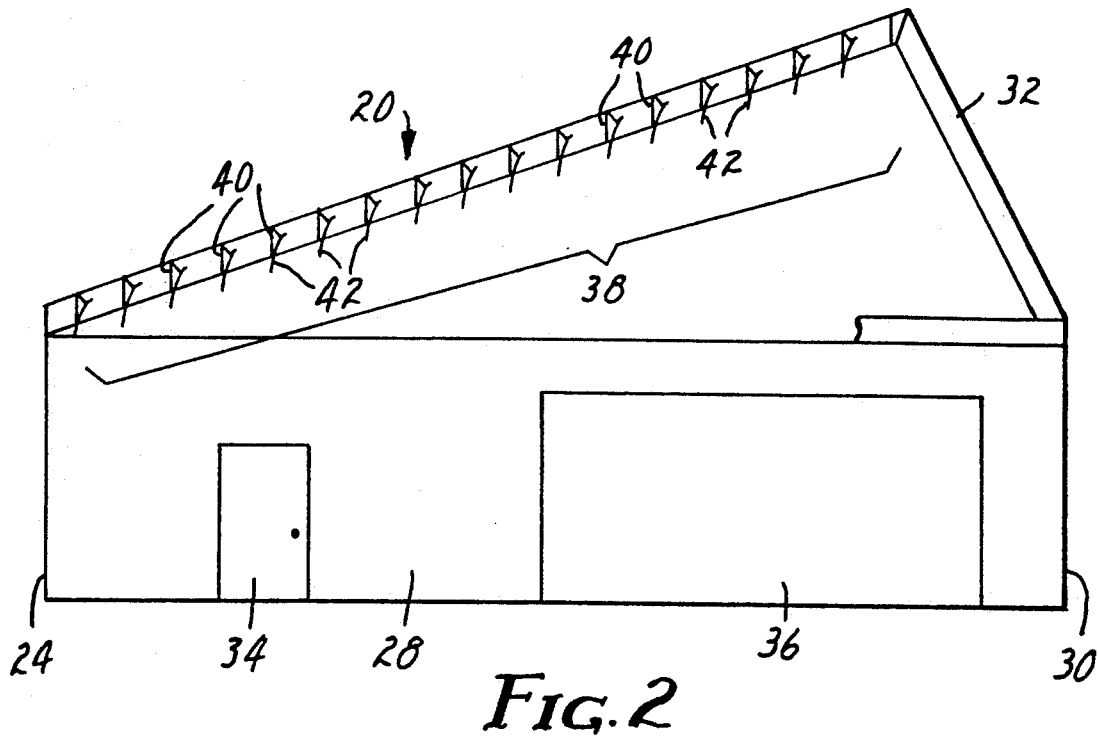
FIG. 2 is a side elevation view of the greenhouse.
Figure 3:
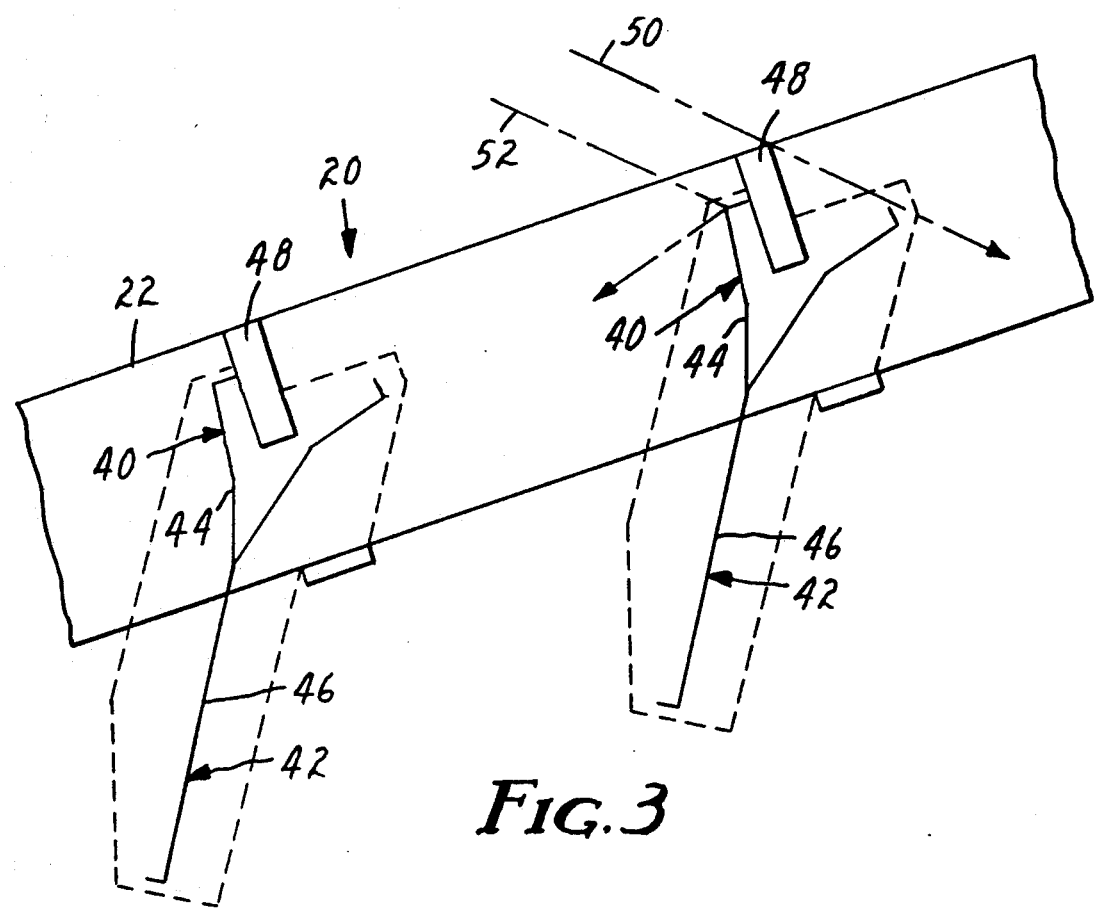
FIG. 3 is an enlarged cross-sectional view of the first and second light-reflecting means.

Referring now to FIGS. 2 and 3, an optical system 38 is located inside the greenhouse 20, adjacent the roof panel 22. The optical system 38 comprises a plurality of rows of elongated spaced optical panels generally adjacent and extending transversely across the light-transmitting roof panel 22. Each panel comprises a thin backing portion forming first and second concave, opposite sides, a first light reflecting means 40 including light-reflecting surfaces 44 attached to the first side of the backing and a second light reflecting means 42 including light-reflecting surfaces 46 attached to the second side of the backing such that the light-reflecting surfaces 44 and 46 of the same panel face generally oppositely.

The plurality of elongated spaced optical panels are positioned such that the first light reflecting means 40 faces the second light reflecting means 42 of an adjacent panel so that the first light-reflecting means 40 receives light transmitted through the roof panel 22 and reflects the light to the second light-reflecting means 42 of the adjacent panel, and the second light-reflecting means 42 receives light from the first light-reflecting means 40 and reflects the light substantially vertically downwardly.

The optical panels are preferably arranged in parallel rows extending transversely across the light-transmitting roof panel 22. The positioning of the optical panels beneath the sloped roof panel 22 maximizes the collection of sunlight. Unlike optical systems for multi-story office buildings, as much as 80–90 percent of the light striking the roof panel 22 is unobstructed by the greenhouse or the optical system 38, and is reflected to the plants P in the greenhouse 20. A preferred arrangement of the optical panels is shown in FIG. 3, where the panels are arranged "back-to-back", with their upper portions separated to accommodate the roof beams 48 that support the roof panel 22. As shown in FIG. 3, the ends of the optical panels may be adapted to slide into a support (dashed lines) attached to the left and right side walls 26 and 28.

The slope of the roof panel 22 affords placement of the first light reflecting means 40 including light-reflecting surfaces 44 at a higher level than the adjacent, cooperating second light reflecting means 42 including light-reflecting surfaces 46 to reduce shading between first and second light reflecting means 40 and 42. As illustrated in FIG. 3, the majority of the light reaching the roof panel 22 of the greenhouse 20 reaches the optical system 38 and is redirected to the plants in the greenhouse 20. Only the portion of the light between lines 50 and 52 strike the support structure and is not reflected by the optical system 38 to the plants.

Figure 7A:
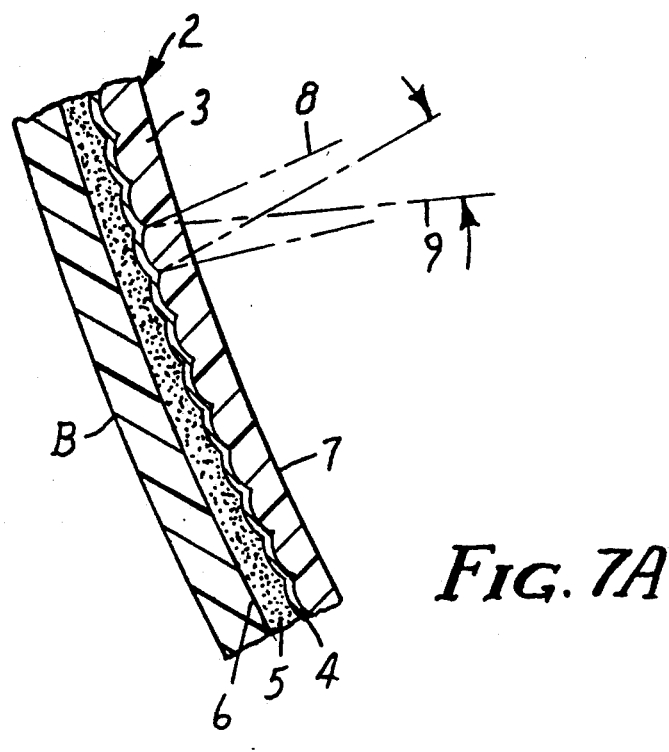
FIG. 7A is an exploded diagram showing one example of 3M Solar Daylighting Film placed in direct sunlight and having the structure of the film exaggerated to show details.
Figure 7B:
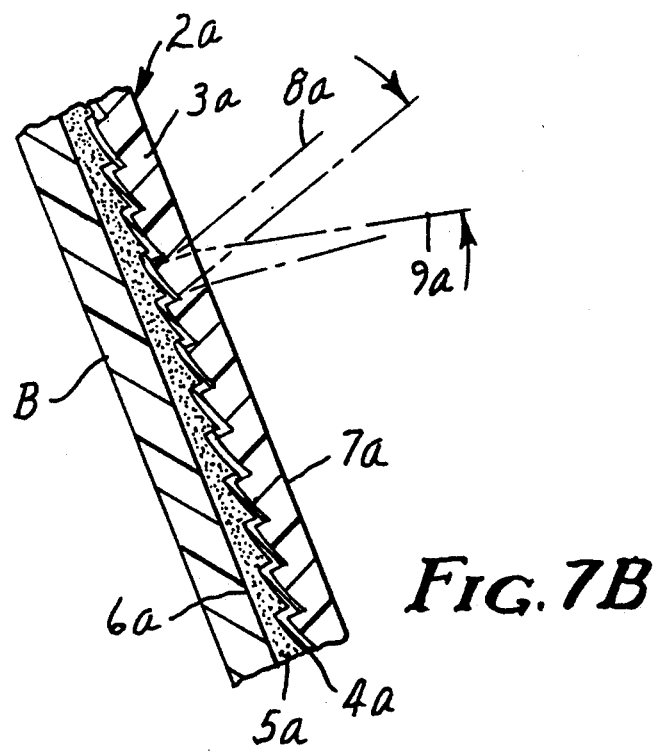
FIG. 7B is an exploded diagram showing a second example of 3M Solar Daylighting Film with the structure of the film exaggerated to show details.

The light reflecting surfaces 44 and 46 may comprise fresnel lenses constructed according to the teachings of U.S. Pat. No. 4,800,868. Alternatively, these surfaces may comprise a sheet of 3M Solar Lensfilm, available from the Minnesota Mining and Manufacturing Company, St. Paul, Minnesota. FIGS. 7A and 7B illustrate embodiments of 3M Solar Lensfilm, (sold under the trade designation 3M Solar Daylighting Film and available from the Minnesota Mining and Manufacturing Company, St. Paul, Minnesota) generally designated by the reference characters 2 and 2A. FIGS. 7A and 7B illustrate two embodiments of the construction of an optical panel and show a broken away portion of that panel in sunlight. Of course, the preferred embodiment of the greenhouse of the present invention includes a roof panel 22 and the optical panels only receive the sunlight after it is transmitted through the roof panel 22.

The 3M Solar Daylighting Films 2 and 2A are continuous webs of optically clear acrylic 3, 3A with curved facets or prisms 4, 4A formed on one side of the web 3, 3A. The radius of curvature of the prisms 4 is such that collimatted light is spread plus or minus 5 degrees or a total of ten degrees. The prisms 4 are reflectorized with aluminum or silver and subsequently coated with an optically clear pressure sensitive adhesive encapsulating reflective layer 5, 5A. Generally, aluminum will reflect about 85%-90% of the light while silver will reflect about 94%-97% of the light. Thus, where maximum light levels are desired, silver is the preferred reflecting surface. The adhesive sides 6, 6A of the films 2, 2A allows the film to be bonded to a transparent or opaque substrate or backing B. The sides 7, 7A of the films 2, 2A opposite the adhesive side 6, 6A are generally smooth.

A relatively thin, transparent acrylic substrate B is preferably used to construct the optical panels. Such a backing minimizes the quantity of materials required and reduces the amount of space occupied by the optical system 44 to reduce shading between the optical panels.

The backing B preferably comprises a thin sheet or film of acrylic. The thickness of the backing B is in the range between 0.0625 and 0.125 inches, preferably 0.09375 inches. If the thickness of the backing B is greater than 0.125 inches the optical panels become bulky and the optical panel to optical panel shading increases. Also, if the thickness of the backing B is less than 0.0625, the structual integrity of the optical panels is reduced. To construct an optical panel, one appropriately shaped backing B may be adhesively attached to another appropriately shaped backing B to form the shape of the optical panels shown in FIG. 3 and the entire surface of the backing or selected portions thereof may be laminated with 3M Daylighting Film.

Direct solar light 8 has a spread of ½ degree. The film 2 reflects the direct solar light 8 and the reflected light 9 has a spread of approximately 10 degrees. Since, the reflected light is spread, the optical system 38 reduces the likelihood of "hot spots". This is accomplished without unduly sacrificing light intensity.

The light reflecting surfaces 44 and 46 can be configured and oriented so that they capture and redirect sunlight regardless of its incident angle, and thus the panels do not have to be repositioned as the apparent position of the sun moves along the ecliptic from its southern most position (in winter in northern latitudes) to its northern most position (in summer in northern latitudes). However, a simple sun-tracking feature can be easily incorporated in the optical system 38 by making light reflecting surfaces 44 pivotable about their upper edges, to following the changing position of the sun. This allows for improved light collection and/or allows the light reflecting surfaces 46 to be made smaller, provides greater collimation of light within the greenhouse 20, and even makes it feasible to redirect the light to angles other than vertical, if desired. Light reflecting surfaces 46 could similarly be made adjustable.

In the preferred embodiment, the light reflecting surfaces 44 and 46 are fixed and are preferably configured and oriented to maximize collection of fall-winter-spring sun. Not configuring and positioning the light reflecting surfaces 44 and 46 to maximize the collection of spring-summer-fall sun increases the efficiency of the optical system during the fall, winter, and spring. However, the light reflecting surfaces 44 and 46 could be specifically configured to collect sunlight during the spring-summer-fall period as well. Light reflecting surfaces 44 might be provided with a compound configuration, with surfaces specifically oriented for collection of winter sunlight and for collection of summer sunlight.

Figure 4:
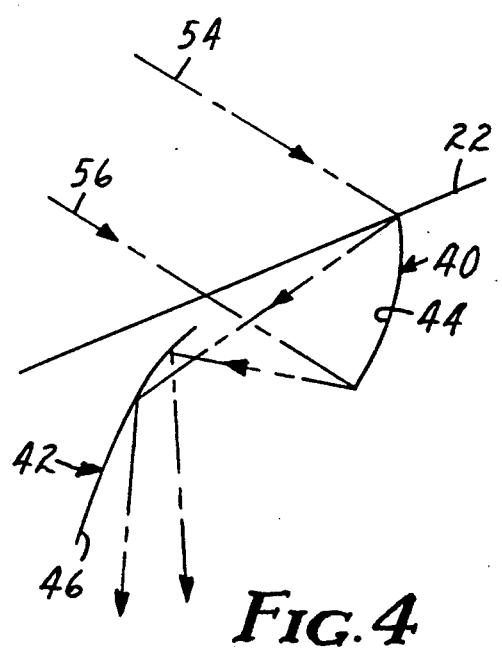
FIG. 4 is a schematic diagram showing how the light-reflecting panels reflect incident sunlight generally vertically downwardly inside the greenhouse.

Thus, regardless of the angle of the incident sunlight, the optical system 38 reflects the sunlight substantially vertically downwardly, as shown in FIG. 4, where incident sunlight, represented by rays 54 and 56 pass through roof panel 22, reflect off of the first light-reflecting means 40 (light reflecting surface 44) to second light-reflecting means 42 (light reflecting surface 46), and then substantially vertically downwardly. This redirection of the sunlight offers several advantages. First, the vertical redirection of the sunlight, provides more uniform growth and reduces the plant shading. This reduces or eliminates the need to periodically reposition the plants in the greenhouse, thereby reducing operating expenses.

Figure 5:
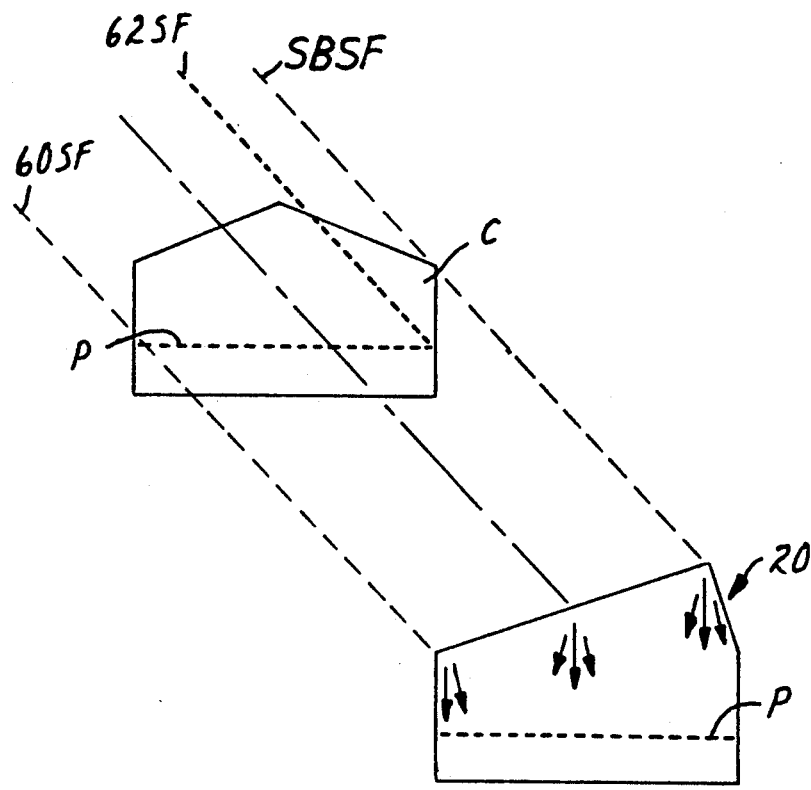
FIG. 5 is a diagram comparing the light collection of a conventional greenhouse with the light collection of a greenhouse constructed according to the principles of the present invention during spring/fall.
Figure 6:
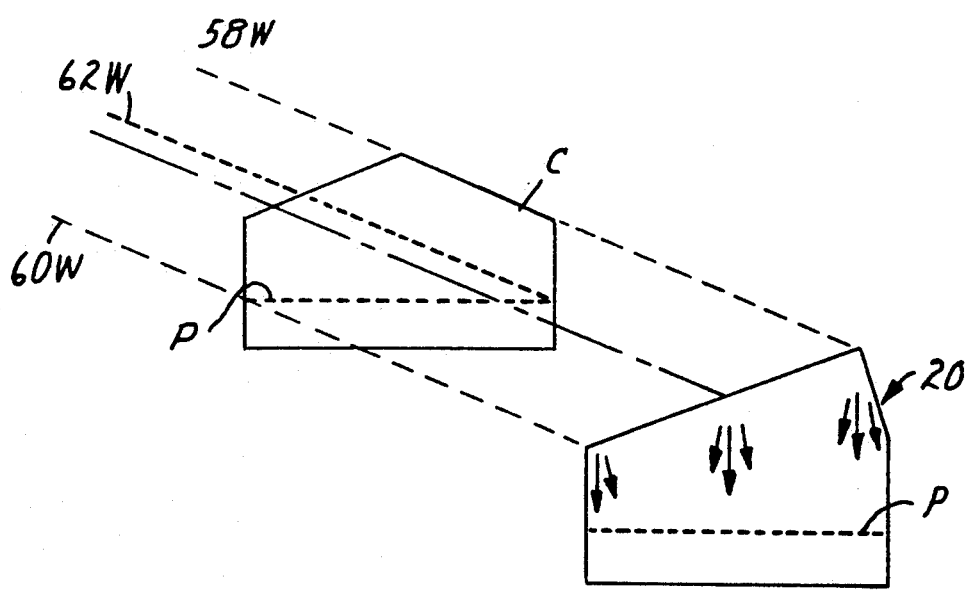
FIG. 6 is a diagram comparing the light collection of a conventional greenhouse with the light collection of a greenhouse constructed according to the principles of the present invention during winter.

Moreover, the redirection of the sunlight maximizes light collection, directing a greater percentage of incident sunlight to the plants. This is illustrated in FIGS. 5 and 6. In FIG. 5, incident spring/fall sunlight defined between lines 58SF and 60SF is illustrated as it would strike a conventional greenhouse C and a greenhouse 20 constructed according to the principles of this invention. From FIG. 5 it is apparent that the portion of incident sunlight between line 58SF and 62SF does not reach the plants P in the conventional greenhouse C, but substantially all of the sunlight between lines 58SF and 60SF reaches the plants P in the greenhouse 20. For example, assuming that the sun is at an angle of about 45°, the greenhouse 20 of the present invention collects 25% more of the incident sunlight. Of course, the increase in collected light does not necessarily correspond to the same increase in light reaching the plants P. Since the light must reflect off two reflectors to reach the plants and there is generally about a 3% to 15% loss at each reflector, less than 100% of the additional collected light reaches the plants P. However, considering that conventional greenhouses frequently use light diffusers to try to achieve the light uniformity attained by the reflectors, and these light diffusers transmit as little as 40%-60% of the light, the performance of the present invention is superior to conventional greenhouses.

In FIG. 6, incident winter sunlight defined between lines 58W and 60W is illustrated as it would strike the conventional greenhouse C and the greenhouse 20 constructed according to the principles of the present invention. From FIG. 6 it is apparent that the portion of incident sunlight between lines 58W and 62W does not reach the plants P in the conventional greenhouse C, but all of the sunlight between lines 58W and 60W reaches the plants P in the greenhouse 20. It is believed that the amount of sunlight collected by the greenhouse 20 in winter may be as much as 65% more than a conventional greenhouse C.

The roof panel 22 slopes toward the equator, so that the panel 22 generally faces the sun. The panel preferably slopes at an angle of between about 15° and about 20° with respect to the horizontal. The preferred slope depends upon the latitude of the greenhouse, increasing as the distance from the equator increases. The panel 22 preferable has a generally east-west orientation. The panels 44 and 46 are preferably elongate, and their longitudinal axes extend parallel to the general east-west orientation of the greenhouse 22, i.e. in the northern hemisphere they face generally south and in the southern hemisphere they face generally north. Of course, the roof panel 22 and the light reflecting surfaces 44 and 46 could be oriented in some other direction to maximize the collection of sunlight during peak growth periods. For example, since many plants require more sunlight during early morning hours, the greenhouse can be oriented eastwardly (e.g. 30° from east-west) to maximize collection of morning sunlight.

OPERATION

In operation, sunlight passes freely through the roof panel 22, striking the light reflecting surfaces 44 comprising the first light-reflecting means 40. The sunlight reflects off of the light reflecting surfaces 44 to light reflecting surfaces 46 comprising the second light-reflecting means 42. The sunlight reflects off of the light reflecting surfaces 46 generally vertically downwardly to the plants P at the bottom of the greenhouse 20. The light reflecting surfaces 44 and 46 can be constructed so that they do not require adjustment to accommodate the changing apparent position of the sun from winter to summer. The greenhouse 20 thus provides uniform, generally vertically directed light to the plants P, achieving more uniform growth and eliminating plant-to-plant shading. The greenhouse 20 actually collects a greater incident sunlight and directs it toward the plants P.

The elimination of glass or plastic walls, except for the roof panel 22, reduces the cost of construction and maintenance. The ability to insulate the walls reduces heating and air conditioning requirements, reducing operating costs.

According to the method of growing plants of this invention, a greenhouse 20, having a sloped roof panel 22, is provided. An optical assembly 38, comprising panels having first and second light-reflecting means 40 and 42 and a relatively thin backing B is also provided inside the greenhouse 20, adjacent the sloped roof panel 22. The method includes the steps of (1) positioning the plurality of elongate spaced optical panels such that the first light reflecting means 40 faces the second light reflecting means 42 of an adjacent panel so that the first light-reflecting means receives light transmitted through the roof panel, (2) reflecting the light transmitted through the roof panel 22 to the second light-reflecting means 42 of the adjacent panel, and (3) reflecting the light from the first light-reflecting means substantially vertically downwardly by the second light-reflecting means 42. The greenhouse 20 provided greater total illumination than conventional greenhouses, and generally vertically downward directional light for more uniform growth.

The present invention has now been described with reference to several embodiments thereof. It will be apparent to those skilled in the art that many changes can be made in the embodiment described without departing from the scope of the present invention. Thus the scope of the present invention should not be limited to the structure described in this application, but only by structures described by the language of the claims and the equivalents of those structures.

What is claimed is:

1. A greenhouse comprising:
   a plurality of walls,
   a light-transmitting roof panel; and
   an optical system inside the greenhouse, the optical system comprising:
   a plurality of rows of elongate spaced optical panels generally adjacent and extending transversely across the light-transmitting roof panel, each panel comprising:
   a thin backing portion forming first and second opposite sides,
   a first light reflecting means including light-reflecting surfaces attached to the first side of the backing and a second light reflecting means including light-reflecting surfaces attached to the second side of the backing such that the light-reflecting surfaces face generally oppositely,
   said plurality of elongate spaced optical panels being positioned such that said first light reflecting means faces the second light reflecting means of an adjacent panel so that the first light-reflecting means receives light transmitted through the roof panel and reflects the light to the second light-reflecting means of said adjacent panel, the second light-reflecting means receives light from the first light-reflecting means and reflects the light substantially vertically downwardly, and wherein the first and second light reflecting means comprise reflectorized fresnel lenses.

2. The greenhouse according to claim 1 wherein said backing comprises a thin film of acrylic with a thickness in the range between 0.0625 and 0.125 inches.

3. The greenhouse according to claim 2 wherein said backing comprises a first concave thin film of acrylic and a second concave thin film of acrylic adhesively attached to said first thin film of acrylic.

4. The greenhouse according to claim 1 wherein the light-transmitting roof panel is sloped generally toward the equator.

5. The greenhouse according to claim 4 wherein the light-transmitting roof panel is sloped at an angle of between about 15° and about 20° with respect to horizontal.

6. The greenhouse according to claim 4 wherein the orientation of the first light reflecting means is adjustable to accommodate seasonal changes in the sun's position in the sky.

7. The greenhouse according to claim 1 wherein the rows extend generally east-west, generally parallel to the apparent east-west motion of the sun.

8. The greenhouse according to claim 1 wherein the rows extend at an angle to east-west, to maximize the collection of sunlight during a particular time of the day.

9. The greenhouse according to claim 1 wherein sidewalls of the greenhouse are insulated.

10. The greenhouse according to claim 1 wherein the sidewalls of the greenhouse ar substantially opaque.

* * * * *